(12) United States Patent
Heitzler et al.

(10) Patent No.: US 9,249,999 B2
(45) Date of Patent: Feb. 2, 2016

(54) MAGNETOCALORIC HEAT GENERATOR

(75) Inventors: Jean-Claude Heitzler, Horbourg Wihr (FR); Christian Muller, Strasbourg (FR)

(73) Assignee: Cooltech Applications S.A.S., Holtzheim (FR)

( * ) Notice: Subject to any disclaimer, the term of this patent is extended or adjusted under 35 U.S.C. 154(b) by 462 days.

(21) Appl. No.: 13/147,441

(22) PCT Filed: Feb. 15, 2010

(86) PCT No.: PCT/FR2010/000127
§ 371 (c)(1),
(2), (4) Date: Aug. 2, 2011

(87) PCT Pub. No.: WO2010/094855
PCT Pub. Date: Aug. 26, 2010

(65) Prior Publication Data
US 2011/0289938 A1    Dec. 1, 2011

(30) Foreign Application Priority Data
Feb. 17, 2009   (FR) ...................... 09 51019

(51) Int. Cl.
*F25B 21/00*   (2006.01)
(52) U.S. Cl.
CPC ........... *F25B 21/00* (2013.01); *F25B 2321/002* (2013.01); *Y02B 30/66* (2013.01)
(58) Field of Classification Search
CPC ...................................................... F25B 21/00
USPC ............................................................ 62/3.1
See application file for complete search history.

(56) References Cited

U.S. PATENT DOCUMENTS
3,413,814 A * 12/1968 Van Geuns ........................ 62/3.1
(Continued)

FOREIGN PATENT DOCUMENTS
DE   1 272 467           7/1968
DK   WO 2006/074790   *   7/2006   .............. F25B 21/00
(Continued)

OTHER PUBLICATIONS

The Engineerin Tool Box "Arithmetic and Logarithmic Mean Temperture Difference" Aug. 22, 2006—http://www.engineeringtoolbox.com/arithmetic-logarithmic-mean-temperature-d_436.html.*
(Continued)

*Primary Examiner* — Marc Norman
*Assistant Examiner* — Antonio R Febles
(74) *Attorney, Agent, or Firm* — Davis & Bujold, P.L.L.C.; Michael J. Bujold

(57) ABSTRACT

A magnetocaloric heat generator (10) comprising at least one magnetocaloric element (2) with a first and second ends (3, 4), a magnetic arrangement for subjecting the magnetocaloric element (2) to a variable magnetic field, alternately creating heating and cooling cycles in the magnetocaloric element (2), a mechanism for circulating a heat transfer fluid through the magnetocaloric element (2) alternately towards the first and second ends (3, 4) and vice versa in synchronisation with the variation of the magnetic field, and at least one energy exchange mechanism (15). This heat generator (10) is crossed in one direction by the heat transfer fluid entering the magnetocaloric element (2) through one of the ends (3, 4) during a heating or cooling cycle and to be crossed in the opposite direction by the heat transfer fluid exiting the magnetocaloric element (2) through the same end (3, 4) during the other cooling or heating cycle.

9 Claims, 4 Drawing Sheets

(56) References Cited

U.S. PATENT DOCUMENTS

| | | | |
|---|---|---|---|
| 6,293,106 B1* | 9/2001 | Acharya et al. | 62/3.1 |
| 7,644,588 B2* | 1/2010 | Shin et al. | 62/3.1 |
| 2003/0034152 A1* | 2/2003 | Lomax et al. | 165/135 |
| 2007/0186560 A1* | 8/2007 | Schauwecker et al. | 62/3.1 |
| 2007/0220901 A1 | 9/2007 | Kobayashi et al. | |
| 2010/0071383 A1* | 3/2010 | Zhang et al. | 62/3.1 |
| 2011/0308258 A1* | 12/2011 | Smith et al. | 62/3.1 |

FOREIGN PATENT DOCUMENTS

| | | | |
|---|---|---|---|
| EP | 1 818 628 A2 | 8/2007 | |
| JP | 2000-018198 A * | 1/2000 | F04D 29/54 |

OTHER PUBLICATIONS

"Fridge of the Future", Mechanical Engineering, ASME. New York, vol. 116, No. 12, Dec. 1, 1994, pp. 76-80.

* cited by examiner

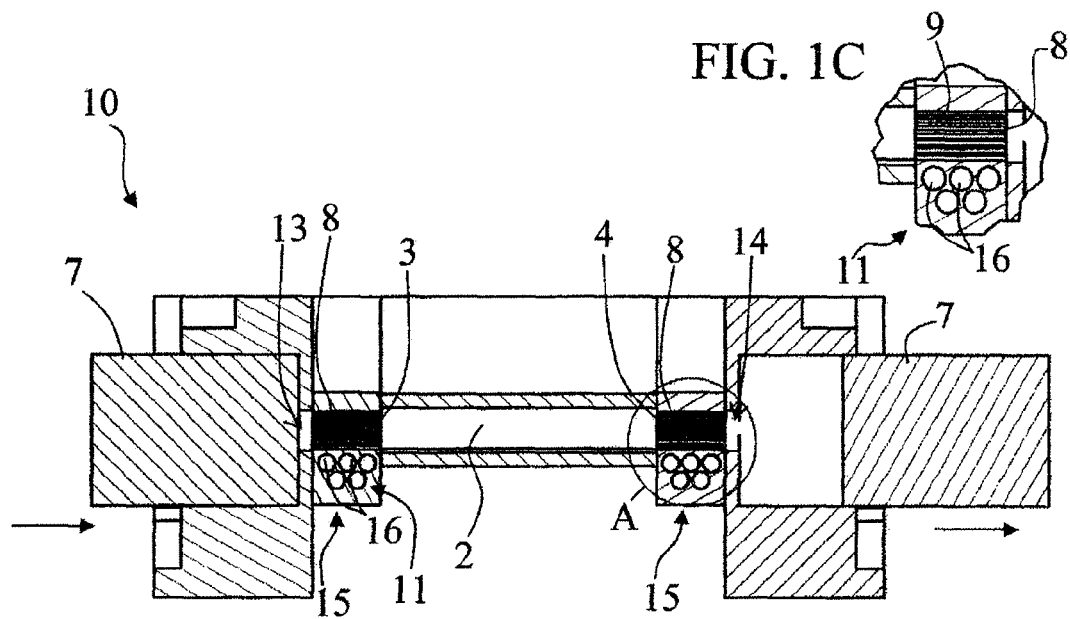
FIG. 1A
FIG. 1C
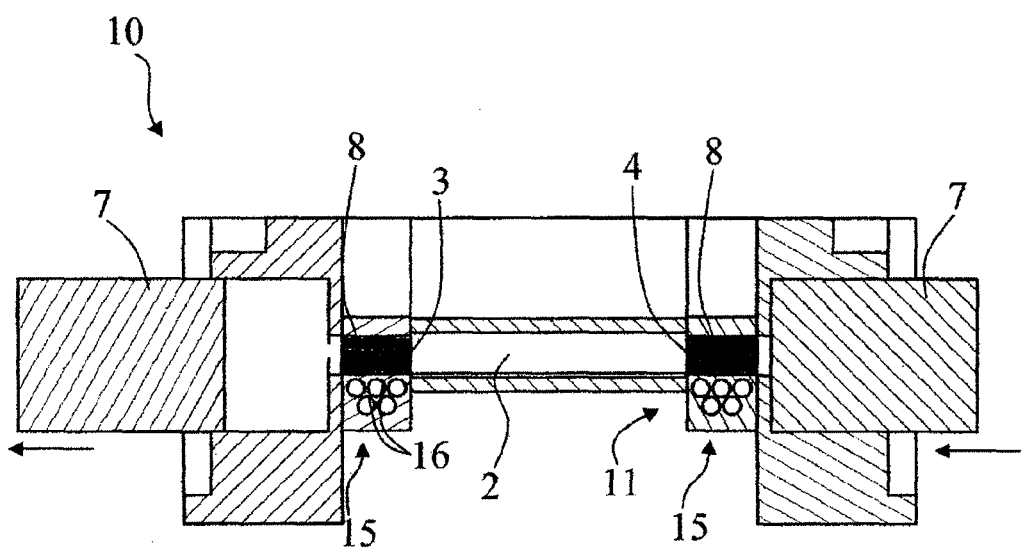
FIG. 1B

MAGNETOCALORIC HEAT GENERATOR

This application is a National Stage completion of PCT/FR2010/000127 filed Feb. 15, 2010, which claims priority from French patent application serial no. 0951019 filed Feb. 17, 2009.

TECHNICAL SCOPE

The present invention relates to a magnetocaloric heat generator comprising at least one magnetocaloric element comprising a first end and a second end, a magnetic arrangement intended for subjecting each magnetocaloric element to a variable magnetic field, creating alternately in each magnetocaloric element a heating cycle and a cooling cycle, a means for circulating a heat transfer fluid through said magnetocaloric element alternately towards the first end and towards the second end and vice versa, in synchronisation with the variation of the magnetic field, and at least one means of exchange of the thermal energy produced by said magnetocaloric element with a device external to said magnetocaloric element, said exchange means being integrated in the heat generator so as to be crossed in one direction by the heat transfer fluid entering the magnetocaloric element through one of the ends during a heating or cooling cycle and to be crossed in the opposite direction by the heat transfer fluid exiting the magnetocaloric element through the same end during the other cooling or heating cycle, said exchange means being juxtaposed with at least one of the ends of the magnetocaloric element and arranged at least between a means for circulating the heat transfer fluid and one of the ends of said magnetocaloric element.

PRIOR TECHNIQUE

Magnetic refrigeration technology has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

The goal of the heat exchangers is to deliver to or exchange with one or several applications external to said heat generator the thermal energy generated by said heat generator. These external applications can be the air surrounding the heat generator, a thermal device or enclosure, for example.

The known magnetocaloric heat generators are made of magnetocaloric elements crossed alternately entirely by a heat transfer fluid.

In a first known configuration, this heat transfer fluid is put in alternating circulation between a first cell, which is in communication with the first end of the magnetocaloric elements, and a second cell, which is in communication with the second end of the magnetocaloric elements, and a heat exchanger is connected thermally with each of said cells.

In a second configuration, each cell is in fluidic communication with a heat exchanger integrated in a hydraulic loop.

However, these existing configurations are not totally satisfactory. In fact, in both cases, a part of the thermal energy is lost between the outlet of the thermal modules and the heat exchangers during the heat exchanges, due in particular to the thermal resistances and leakages in the exchangers.

The publication EP 1 818 628 describes a magnetocaloric generator in which the heat exchangers seem to be connected directly to the cold and hot ends of the thermal element with magnetocaloric material and to be crossed by the heat transfer fluid at each magnetisation and demagnetization cycle. The technical publication "Fridge of the future" (Mechanical Engineering, Asme. N.Y., US, vol. 116, no. 12, $1^{st}$ Dec. 1994, pages 76-80, XP000486088-ISSN: 0025-6501-page 3) also describes a refrigeration system in which the heat exchangers seem to be connected directly to the cold and hot ends of the thermal element. Yet, these publications do not give any indication about the means carrying out the thermal exchange with one or several external circuits.

DESCRIPTION OF THE INVENTION

The present invention aims to overcome these disadvantages by proposing an industrial solution to the problems described above. To that purpose, the magnetocaloric heat generator according to the invention is designed in such a way that the transfer of thermal energy between the heat generator and the external application(s) is optimised in order to reduce at the maximum the thermal losses.

For this purpose, the invention relates to a magnetocaloric heat generator of the kind defined in the preamble, characterized in that said exchange means comprises at least one heat transfer zone and at least one circuit made of at least one conduit in which circulates an external fluid belonging to said external device.

The transfer zone is advantageously provided with through passages or pores for the heat transfer fluid.

Said conduit may have a cylindrical, possibly rectangular shape, or it may also be made of pores formed in said exchange means. It may also be defined by grooves.

Said heat generator may in particular comprise at least two circuits, in which the external fluid of said external device circulates alternately in contraflow.

As a variant, said exchange means may comprise fins on its periphery in order to exchange with the external environment.

Finally, said magnetocaloric element may comprise at least two magnetocaloric materials arranged consecutively and making up at least two consecutive thermal stages in fluidic connection with each other through a common circulation means for the heat transfer fluid.

In such a configuration, two adjacent materials may be subjected two by two either to the same heating or cooling cycle, or to a different heating and cooling cycle. In the first case, two adjacent materials are crossed at each cycle in the same direction by the heat transfer fluid and, in the second case, they are crossed in an opposite direction of circulation.

Moreover, in order to minimise the thermal losses, said exchange means may be covered with a layer of heat insulating material.

BRIEF DESCRIPTION OF THE DRAWINGS

The present invention and its advantages will be better revealed in the following description of several embodiments given as non limiting examples, in reference to the drawings in appendix, in which:

FIGS. 1A and 1B are schematic views of a heat generator according to the invention, FIG. 1C is an enlarged view of detail A of FIG. 1A.

ILLUSTRATIONS OF THE INVENTION

Figure 2:
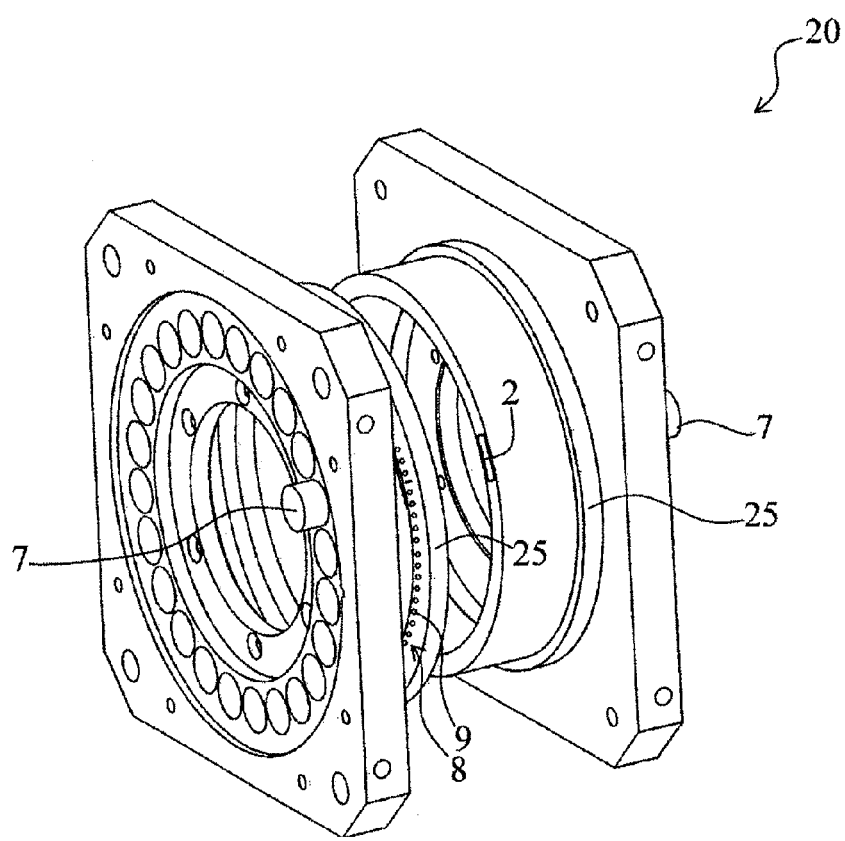
FIG. 2 is an exploded perspective view of the heat generator represented in FIGS. 1A and 1B.

In the illustrated embodiment examples, the identical parts or elements have the same numeric references.

The heat generators 10, 20, 30 comprise one or several magnetocaloric elements 2. Even though the represented magnetocaloric elements 2 comprise only one magnetocaloric material, the invention is not restricted to this number. In fact, a magnetocaloric element 2 may comprise several magnetocaloric materials having different Curie temperatures and producing a high magnetocaloric effect, so that their juxtaposition allows achieving a high temperature gradient between the end 3 and the end 4 of the magnetocaloric element 2 and thus obtaining an even higher efficiency in the heat generator 10, 20, 30. Such a configuration also allows covering a wide range of temperatures that can correspond to the operating or using range of said generator.

Each magnetocaloric element 2 comprises two opposite ends, a for example cold first end 3, and a for example hot second end 4. A heat transfer fluid is put in circulation through this magnetocaloric element 2 towards one or the other of the ends 3 and 4 and in relation with the variation of said magnetic field in order to achieve and maintain a temperature gradient between the two opposite ends 3 and 4 of this magnetocaloric element 2.

Each of these ends 3, 4 is in fluidic connection with a cell 13, 14 containing the heat transfer fluid and in which the means for circulating the heat transfer fluid may be integrated when it appears in the form of a piston 7, as in the represented examples of embodiment. Of course, the invention is not restricted to this type of means for circulating the heat transfer fluid and any other similar means, such as a pump or similar, may be considered.

In the represented heat generators 10 and 20, in particular in that of FIGS. 1A and 1B, the heat transfer fluid circulates through said magnetocaloric element 2 towards the second end 4—which may be considered as the hot end—during the heating cycle (see FIG. 1A) and towards the first end 3—which may be considered as the cold end—during the cooling cycle (see FIG. 1B). A temperature gradient is created this way in the magnetocaloric element 2, between its two ends 3 and 4.

In order to facilitate the heat exchanges with the heat transfer fluid, the magnetocaloric materials making up the magnetocaloric elements 2 may be porous, so that their pores form open fluid passages. They may also be made in the form of a full block in which mini or micro channels are machined or they may be made up of an assembly of possibly grooved superposed plates, between which the heat transfer fluid can flow. They may also be in the form of powder or particles so that the voids form passages for the fluid. Any other embodiment allowing the heat transfer fluid to pass through said magnetocaloric materials can, of course, be suitable.

The magnetic arrangement (not represented) may be made up of an assembly of permanent magnets put in a relative movement with respect to every magnetocaloric element 2, by an electromagnet powered sequentially or by any other similar means liable to create a magnetic field variation.

FIGS. 1A and 1B represent a magnetocaloric generator 10 comprising two identical heat exchangers or exchange means 15 mounted each between an end 3, 4 of the magnetocaloric element 2 and the chamber of a piston 7. This piston 7 forms the circulating or driving means of the heat transfer fluid. The exchange means 15 comprise each a thermal transfer zone 8, made out of a heat conducting or not conducting material, provided with through passages 9 for the heat transfer fluid (see FIG. 1C). Each transfer zone 8 is contiguous to an end 3, 4 of the magnetocaloric element 2 and is thus crossed by the heat transfer fluid when it enters the magnetocaloric element 2 and when it exits it. Such a configuration allows advantageously to achieve two heat exchanges with the heat transfer fluid, during the successive reciprocating movements of the latter through the corresponding magnetocaloric element 2, that is to say, to double the heat exchanges. This is particularly advantageous when the magnetic activation and de-activation cycles have short durations, and when the heat transfer fluid circulates at high speed. This configuration allows making sure that the maximum of thermal energy is exchanged before the heat transfer fluid is reintroduced in the magnetocaloric element 2. The recovery of the thermal energy generated by the heat generator 1 is thus optimised and takes place over the whole cycle time.

Referring more specifically to FIG. 1A, in which the magnetocaloric element 2 is subjected to a magnetic field and the heat transfer fluid circulates from the first end 3 (cold end) towards the second end 4 (hot end), from left to right according to the direction of the arrows, one notes, on the one hand, that the heat transfer fluid passes through the transfer zone 8 of the exchange means 15 located on the side of the first end 3 before passing through the magnetocaloric element 2 and, on the other hand, it passes through the transfer zone 8 of the exchange means 15 located on the side of the second end 4 when it exits the magnetocaloric element 2 after having been heated by its passage through the magnetocaloric element 2 subjected to a magnetic field.

Referring now to FIG. 1B, in which the magnetocaloric element 2 is outside of the magnetic field and cools down, the heat transfer fluid circulates from the second end 4 towards the first end 3 (from right to left according to the direction of the arrows), one notes, on the one hand, that the heat transfer fluid passes again through the transfer zone 8 of the exchange means 15 located on the side of the second end 4 before passing through the magnetocaloric element 2 and, on the other hand, it passes through the transfer zone 8 of the exchange means 15 located on the side of the first end 3 when it exits the magnetocaloric element 2 after having been cooled down by its passage through the magnetocaloric element 2 located outside of the magnetic field.

Thus, the maximum of thermal energy can be recovered or exchanged at each end 3 and 4 of the magnetocaloric element 2 of the heat generator 10 according to the invention. This applies of course to all of the illustrated heat generators 10, 20, 30. The transfer zone 8, and more precisely the through passages 9 of the latter are of course made and designed so that their integration in the concerned cell 13, 14 does not lead to a noticeable increase of the head losses of the heat transfer fluid. To that purpose, the through passages 9 of said transfer zone 8 may show, if need be, a configuration identical to that of the fluid passages or channels in the magnetocaloric element 2 and be aligned with the latter.

The exchange means 15 is designed to transfer the thermal energy exchanged in the transfer zone 8 towards an external device or application. To that purpose, the exchange means 15 comprises a circuit 11 for the circulation of an external fluid intended for an external device or application. The exchange means 15 comprises on the one hand, in addition to the through passages 9 for the heat transfer fluid, conduits 16 forming the circuit 11 for the passage of the external fluid. The represented circuit 11 comprises five conduits 16. The direction of circulation of the fluid in these conduits 16 may be the same, but is preferably different from one conduit to another, to achieve a uniform exchange in the whole exchange means 15 concerned (contraflow circulation).

The invention is of course not restricted to this type of configuration with a fluid circuit 11 for the external application or device. The exchange means 15 may, as an example, comprise fins of any shape or dimension on its external periphery. Moreover, in the case of an external fluid circuit 11 integrated in said exchange means 15, as in the illustrated heat generator 10, said circuit 11 may, as a variant, comprise complementary conduits 16 located on both sides of the transfer zone 8.

FIG. 2 illustrates a heat generator 20 realized according to the principle of the heat generator 10 described in FIGS. 1A and 1B. This heat generator 20 has a circular structure comprising adjacent magnetocaloric elements 2 arranged on a circular ring. The two exchange means 25 both have the shape of a circular ring, made out of a heat conducting or not conducting material, and comprising, on the one hand, through passages 9 allowing the heat transfer fluid to pass through the magnetocaloric elements 2 under the action of the pistons 7 and, on the other hand, a circuit for the circulation of an external fluid. This circuit is not visible on FIG. 2. Likewise, the connecting means of this circuit such as sockets or similar means are not illustrated on this figure. The advantage of such a heat generator 20 lies in its compactness.

Figure 3A:
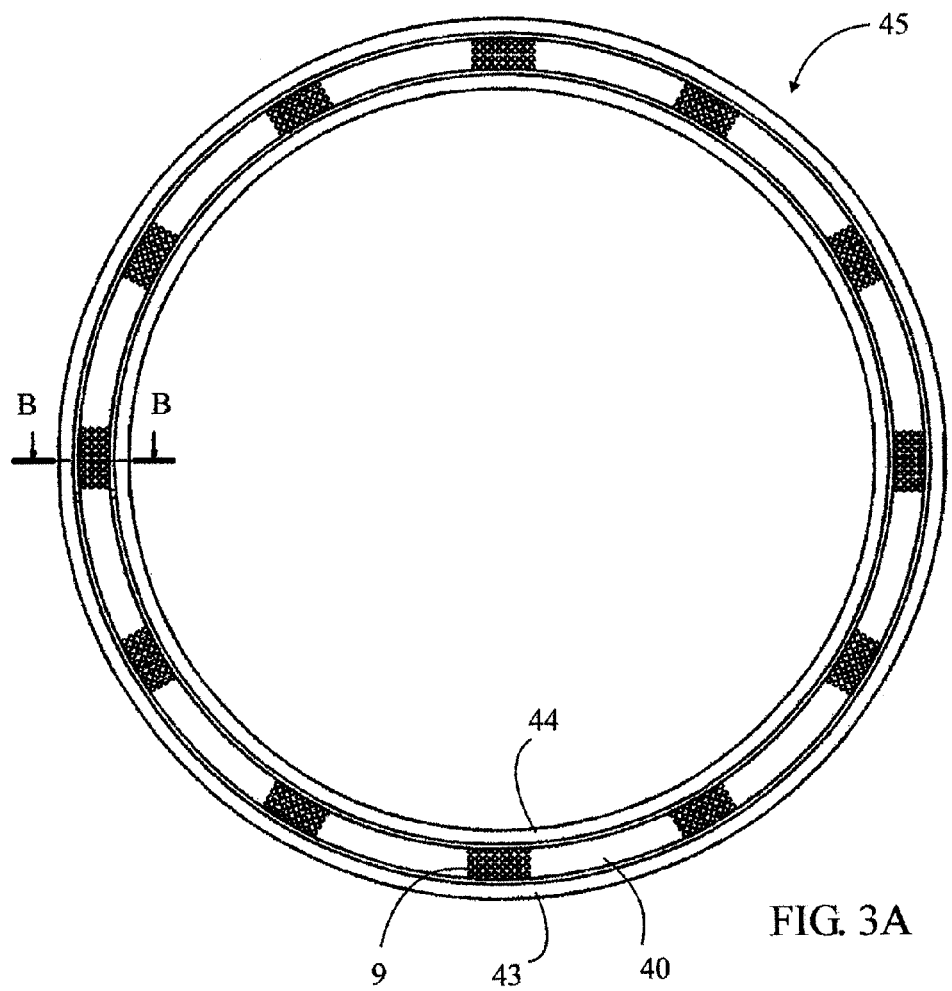
FIG. 3A is a front view of an exchange means of the heat generator of FIG. 2 according to another embodiment.
Figure 3B:
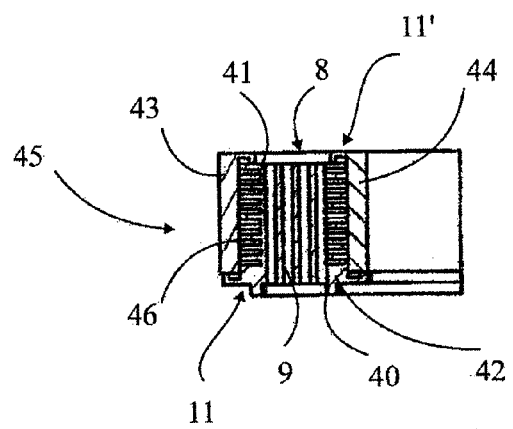
FIG. 3B is an enlarged view of detail B of FIG. 3A, and FIGS. 4A and 4B are views similar to these of FIGS. 1A and 1B representing a heat generator according to an embodiment variant.

FIG. 3A represents an example of an industrial embodiment of an exchange means 45 in the form of a circular ring liable to be used for the construction of the heat generator 20 of FIG. 2. It comprises a ring 40 provided with through passages 9 for the heat transfer fluid, made for example of axially oriented holes arranged so as to match, on one side, each magnetocaloric element 2 and, on the other side, each piston 7, without head loss. The external 41 and internal 42 walls of this ring 40 comprise grooves 46 oriented radially and closed respectively by an external ring 43 and an internal ring 44 to form the conduits of an internal circuit 11' and of an external circuit 11 in which circulates an external fluid transferring, by means of a fluid/fluid exchange, the thermal energy produced by the generator 20. The rings 43 and 44 are assembled on ring 40 by any suitable process allowing obtaining a sealed assembly, such as flanging, crimping, casting, welding, etc. This construction mode has the advantage of being easily industrialized at low cost and creating circuits 11, 11' for the circulation of an external fluid offering a very large heat exchange surface and allowing a more constant laminar flow. Moreover, the realization of two parallel circuits 11, 11', arranged on both sides of the exchange means 45 with the magnetocaloric element 2, allows a homogeneous heat transfer when several magnetocaloric elements 2 are juxtaposed. This homogenizing of the temperature is obtained and improved by circulating the fluid in the internal circuit 11' in the direction opposite to that of the fluid circulating in the external circuit 11. The efficiency of the heat exchange can be further improved by dividing the circuits 11 and 11' in several sectors connected in parallel.

Figure 4A:
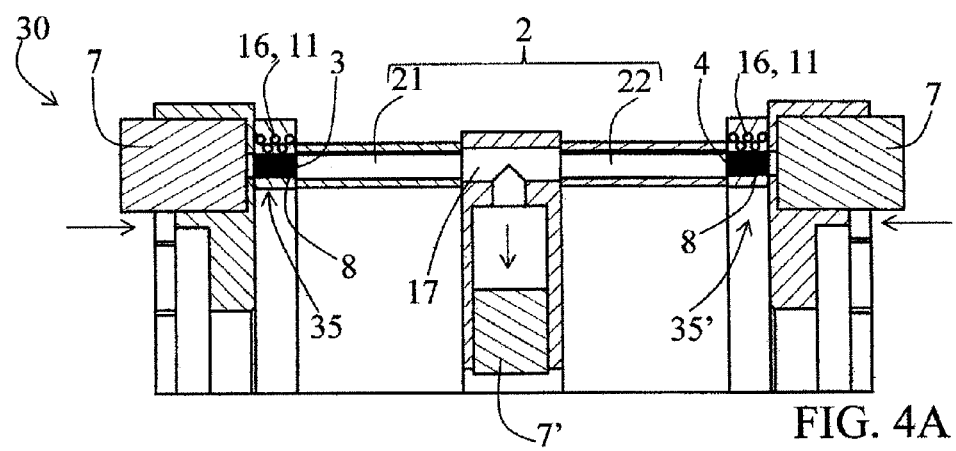
Figure 4B:
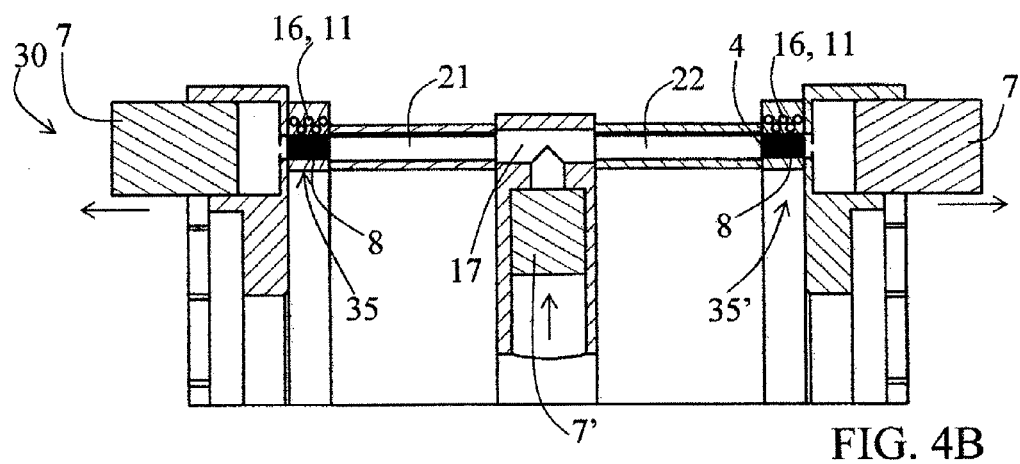

FIGS. 4A and 4B represent an embodiment variant of a heat generator 30 comprising a magnetocaloric element 2 made of two magnetocaloric materials 21 and 22. These magnetocaloric materials 21 and 22 are constantly in opposite magnetic states, that is to say that, when one 21 of said magnetocaloric materials is subjected to a magnetic field, the other magnetocaloric material 22 is outside of the magnetic field, and vice-versa. In this embodiment variant, the first and second ends 3 and 4 are materialized each by an end of each of the magnetocaloric materials 21, 22. An exchange means 35, 35' identical to the exchange means 15 mounted in the generator 10 of FIGS. 1A and 1B is mounted adjacently to each of said ends 3 and 4. The heat transfer fluid is put in circulation through said magnetocaloric materials 21, 22 by three means of circulation 7, 7', that is to say two pistons 7 located each at an end of said magnetocaloric element 2 and a piston 7' whose chamber is connected with a cell 17 common to both materials 21 and 22 and putting them in fluidic connection.

In reference to FIG. 4A, representing one of two operating cycles of the heat generator 30, the magnetocaloric material 21 located on the left of the figure is magnetically activated and the magnetocaloric material 22 located on the right of the figure is magnetically de-activated. The heat transfer fluid circulates from left to right in the magnetocaloric material 21 located on the left and from right to left in the magnetocaloric material 22 located on the right, towards the common cell 17. The heat transfer fluid thus passes simultaneously through, on the one hand, the transfer zone 8 of the exchange means 35 located on the side of the first end 3, which allows exchanging the thermal energy with the heat transfer fluid before it re-enters the magnetocaloric material 21 located on the left and, on the other hand, the transfer zone 8 of the exchange means 35' located on the side of the second end 4, which allows exchanging the thermal energy with the heat transfer fluid before it re-enters the magnetocaloric material 22 located on the right.

In the second cycle, the magnetocaloric material 21 located on the left on the figure is magnetically de-activated and the magnetocaloric material 22 located on the right on the figure is magnetically activated. The heat transfer fluid exits the common cell 17 and circulates from right to left in the magnetocaloric material 21 located on the left and from left to right in the magnetocaloric material 22 located on the right. The heat transfer fluid crosses this way, once more, simultaneously, on the one hand, the magnetocaloric material 21 located on the left while cooling down and also the transfer zone 8 of the exchange means 35 located on the side of the first end 3, and, on the other hand, the magnetocaloric material 22 located on the right while heating up and also the transfer zone 8 of the exchange means 35' located on the side of the second end 4.

Also in this configuration, each magnetic cycle or heating and cooling cycle is used, so that the maximum of thermal energy can be recovered or exchanged at each end 3 and 4 of the magnetocaloric element 2 of the heat generator 30.

Even this is not illustrated, it may also be planned to use an exchange means such as the one described in the present description to connect thermally either two heat generators or two adjacent magnetocaloric elements, forming two consecutive thermal stages of a same heat generator.

In all of the heat generators 10, 20, 30 represented, the exchange means 15, 25, 35, 35', 45 is integrated inside of said generators and arranged contiguously to each end 3, 4 of the magnetocaloric element(s) 2. The invention is however not restricted to this type de configuration and provides also that not all the ends 3, 4 are connected to such an exchange means 15, 25, 35, 35', 45 and that only one of the ends 3 and 4 is connected.

Possibilities for Industrial Application

This description shows clearly that the invention allows reaching the goals defined, that is to say to offer a heat generator 10, 20, 30 with a simple construction in which the transfer of the thermal energy produced by the magnetocaloric elements 2 is simplified and implemented efficiently with a minimum of losses.

The fact of integrating an exchange means 15, 25, 35, 35', 45 in the heat generator according to the invention, so that it is in contact both with the fluid entering and with the fluid exiting the concerned magnetocaloric element allows extracting directly and efficiently from the heat transfer fluid the thermal energy produced in said magnetocaloric element. It must be precised that the same heat transfer fluid enters and exits the same magnetocaloric element, but with a different temperature following the heat exchange between said heat transfer fluid and the heat exchange means 15, 25, 35, 35', 45.

The fact of not using, when starting the heat generator up, the exchange circuit(s) formed by the channel(s) 11, 11' allows reaching faster the temperature gradient between the hot end 4 and the cold end 3 of the magnetocaloric element 2. This possibility allows reducing the operating time of the heat generator and, de facto, its energy consumption. The thermal efficiency of said generator is therefore improved.

Such a heat generator 10, 20, 30 can find an application, as well industrial as domestic, in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetocaloric heat generator comprising a plurality of magnetocaloric elements (2) which each comprise a first end and a second end, a magnetic arrangement for subjecting each of the magnetocaloric elements to a variable magnetic field, alternately creating a heating cycle and a cooling cycle in each of the magnetocaloric elements (2), a circulation element for circulating a heat transfer fluid through the magnetocaloric elements alternately towards the first end (3) and towards the second end (4), and vice versa, in synchronization with the variation of the magnetic field, at least one heat exchanger (15, 25, 35, 35', 45) which exchanges thermal energy produced by the magnetocaloric element with an external device that is external to the magnetocaloric elements (2), the at least one heat exchanger (15, 25, 35, 35') being integrated in the heat generator so as to be crossed, in one direction, by the heat transfer fluid entering the magnetocaloric elements (2) through one of the first and the second ends (3, 4) during a heating or cooling cycle and to be crossed, in the opposite direction, by the heat transfer fluid exiting the magnetocaloric elements (2) through the same end (3, 4) during the other cooling or heating cycle, and the at least one heat exchanger (15, 25, 35, 35', 45) being juxtaposed with at least one of the first and the second ends (3, 4) of the magnetocaloric elements (2) and arranged at least between the circulation element (7), for circulating the heat transfer fluid and the one of the first and the second ends (3, 4) of the magnetocaloric elements (2), wherein the heat generator has a circular structure and the plurality of magnetocaloric elements are arranged and spaced from one another about the circular structure of the heat generator to form a circular ring, and the at least one heat exchanger (15, 25, 35, 35', 45) is shaped as a circular ring;

each of the magnetocaloric elements (2) comprises at least two magnetocaloric elements comprises at least two magnetocaloric materials (21, 22) arranged consecutively and making up at least two consecutive thermal stages in fluidic connection to a cell (17) of a common circulation element (7); and the at least one heat exchanger (15, 25, 35, 35', 45) comprises a plurality of heat transfer zones (8) arranged each in front of one of the magnetocaloric elements, each of the heat transfer zones comprises through passages for the heat transfer fluid and at least one circuit (11) made of at least one conduit in which an external fluid of the external device circulates.

2. The heat generator according to claim 1, wherein the through passages of the transfer zones (8) are formed by pores which facilitate the passage of the heat transfer fluid.

3. The heat generator according to claim 1, wherein the at least one conduit (16), in which an external fluid of the external device circulates, has a cylindrical shape.

4. The heat generator according to claim 1, wherein the at least one conduit (16), in which an external fluid of the external device circulates, is made of pores formed in the at least one heat exchanger.

5. The heat generator according to claim 1, wherein the at least one, in which an external fluid of the external device circulates, is defined by grooves.

6. The heat generator according to claim 1, wherein the heat generator comprises, in each of the transfer zones, at least two circuits (11, 11') in which the external fluid of the external device circulates alternately in contraflow.

7. The heat generator according to claim 1, wherein the at least one heat exchanger (15, 25, 35, 35', 45) is covered with a layer of heat insulating material.

8. The heat generator according to claim 1, wherein the heat exchanger (15, 25, 35, 35', 45) is covered with a layer of heat insulating material.

9. A magnetocaloric heat generator comprising a plurality of magnetocaloric elements (2) which each comprise a first end and a second end, a magnetic arrangement for subjecting each of the magnetocaloric elements to a variable magnetic field, alternately creating a heating cycle and a cooling cycle in each of the magnetocaloric elements (2), a circulation element for circulating a heat transfer fluid through the magnetocaloric elements alternately towards the first end (3) and towards the second end (4), and vice versa, in synchronization with the variation of the magnetic field, at least one heat exchanger (15, 25, 35, 35', 45) which exchanges thermal energy produced by the magnetocaloric element with an external device that is external to the magnetocaloric elements (2), the at least one heat exchanger (15, 25, 35, 35') being integrated in the heat generator so as to be crossed, in one direction, by the heat transfer fluid entering the magnetocaloric elements (2) through one of the first and the second ends (3, 4) during a heating or cooling cycle and to be crossed, in the opposite direction, by the heat transfer fluid exiting the magnetocaloric elements (2) through the same end (3, 4) during the other cooling or heating cycle, and the at least one heat exchanger (15, 25, 35, 35', 45) being juxtaposed with at least one of the first and the second ends (3, 4) of the magnetocaloric elements (2) and arranged at least between the circulation element (7), for circulating the heat transfer fluid and the one of the first and the second ends (3, 4) of the magnetocaloric elements (2), wherein the heat generator has a circular structure and the plurality of magnetocaloric elements are arranged and spaced from one another about the circular structure of the heat generator to form a circular ring, and the at least one heat exchanger (15, 25, 35, 35', 45) is shaped as a circular ring;

the at least one heat exchanger (15, 25, 35, 35', 45) comprises a plurality of heat transfer zones (8) arranged each in front of one of the magnetocaloric elements, each of the heat transfer zones comprises through passages for the heat transfer fluid, extending axially between the at least one of the first and the second ends (3, 4) of the magnetocaloric elements (2) and the circulation element (7)

and at least one circuit (11) made of at least one conduit (16, 46) in which an external fluid of the external device circulates, the at least one conduit extending radially along a circumference of the circular ring, so that the at least one circuit (11) radially extends between the plurality of magnetocaloric elements.

* * * * *